TO MOTOR — POWER INPUT
GOVERNOR

INVENTOR
Georges Quellet

United States Patent Office 3,512,025
Patented May 12, 1970

3,512,025
DISCOIDAL ELECTRODYNAMIC MOTOR
Georges Quellet, Les Ruaux 2013,
Colombier, Switzerland
Filed Dec. 7, 1967, Ser. No. 688,826
Claims priority, application Switzerland, Dec. 13, 1966,
17,842/66
Int. Cl. H02k 21/26
U.S. Cl. 310—154                                    12 Claims

ABSTRACT OF THE DISCLOSURE

An electrodynamic motor having a winding made of flat coils of polygonal shape, said coils being stacked upon each other and disposed each in a radial plane and the winding being intersected by axially extending magnetic fields.

---

This invention relates to an electrodynamic motor having a disc-shaped winding without iron, intersected by axial magnetic fields. In a prior motor of this type a system of printed coils is provided on one or more discs of insulating material. In order to avoid crossing conductors on one side of the disc, the conductors of the winding system are distributed on both sides of the disc, whereby connecting wires or winding heads pass over the outer rim of the disc. A similar motor is known having conductors of such a high rigidity that the insulation carrier or carriers may be omitted. In any case, production of this prior motor is extremely complicated and expensive. Further, the torques obtained with this motor are very limited because the number of conductors of each coil is limited. For the same reason, the motor is only adapted for operation at a relatively low voltage and high current. This results in difficulties with the commutation and high friction losses at the commutator. Therefore, the prior motor is particularly unsuitable for small power because it is hardly possible to overcome the friction losses due to the small number of conductors of the winding system.

It is a primary object of this invention to avoid these disadvantages by providing a winding comprising at least one disc-shaped coil extending through the full circumference of the winding and having a substantially polygonal shape. This allows the use of extremely simple coils of any polygonal shape, for instance square or triangular shape. The coils may be wound in a simple manner with any usual insulated wire of any desired diameter and any desired number of turns. It is thus possible to provide any desired suitable number of turns as is the case in classical motors, and consequently to obtain high torque and high-voltage operation even with relatively small motors. The filling factor of the winding is very high, because practically the total winding space may be filled with conductors. The axial thickness of the winding must not exceed the axial thickness of the winding of the said prior motor because insulating carriers are avoided even with coils wound of thin wire.

The drawing illustrates by way of example, an embodiment of the invention.

Figure 1:
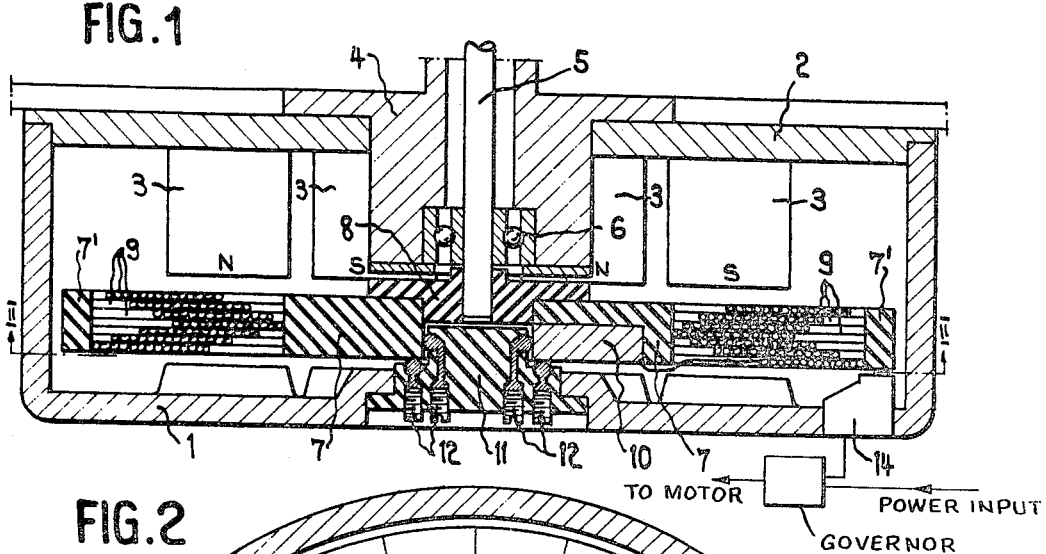
FIG. 1 is an axial section of the motor.
Figure 2:
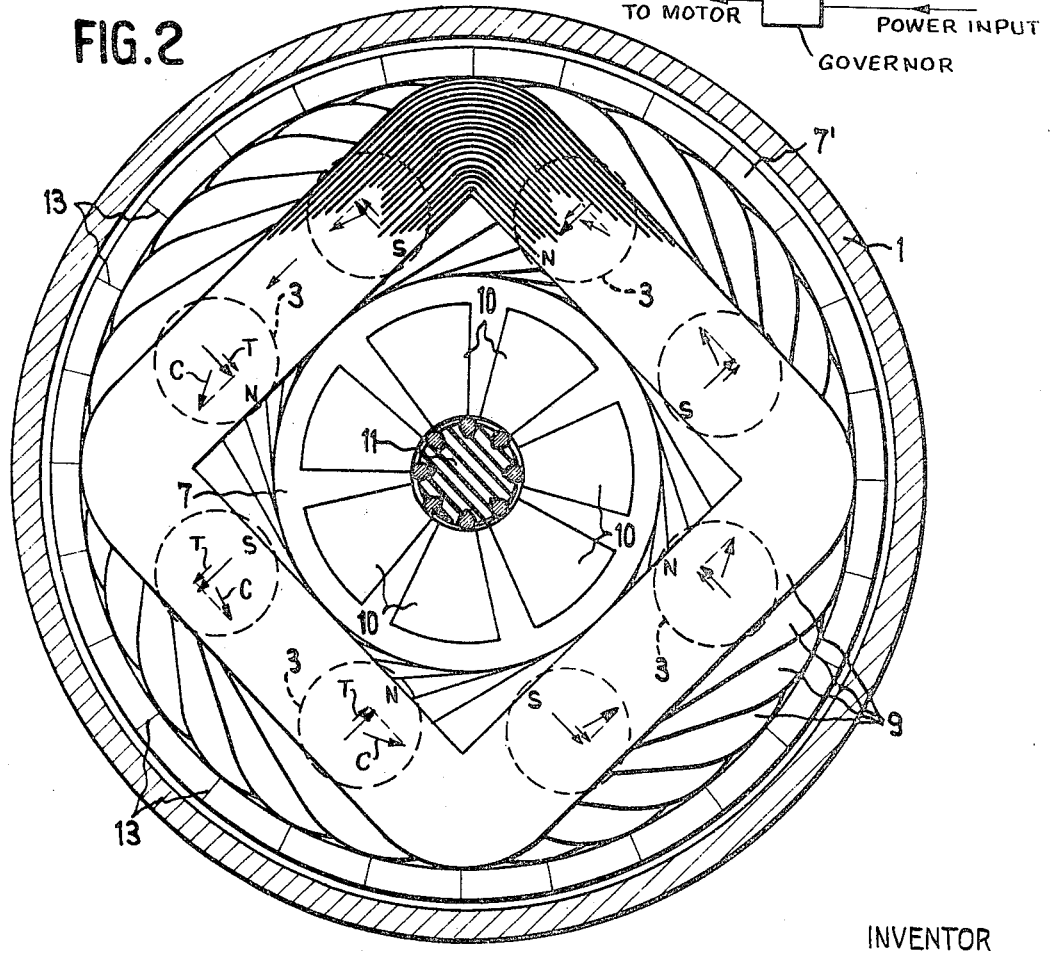
FIG. 2 is a cross section of the rotor along line II—II in FIG. 1.

The motor has a casing 1 of ferromagnetic material closed by a disc 2 of ferromagnetic material carrying eight cylindrical permanent magnets 3. As indicated in FIGS. 1 and 2 the permanent magnets are alternatively polarized in opposite direction. A bearing sleeve 4 is inserted into the plate 2. The motor shaft 5 is rotatably mounted in sleeve 4 by means of ball bearings of which the inner bearing 6 is shown in FIG. 1. A disc 7 of plastics material is mounted on a hub 8 fixed on the motor shaft 5. Seven commutator lamellas 10 are imbedded in this disc of plastics material and a stack of seven flat disc-shaped coils 9 rigidly interconnected by means of an adhesive are inserted between disc 7 and an outer ring 7'. The coils may also be imbedded in one single disc of plastics material. As shown in FIG. 2, the disc-shaped coils 9 are of square form having four coil sides. Each coil side is simultaneously intersected by the magnetic fields of two permanent magnets 3 as is clearly seen for the front coil fully visible in FIG. 2. The coil terminals are connected to adjacent collector segments or commutator lamellas 10. The coils are mutually staggered by an angle or winding step of $2\pi/7$. A carrier 11 or insulating material has bores filled with mercury, the drops of mercury outside the bores forming the brushes contacting the collector. Pairs of mercury brushes are provided contacting the commutator at its inner side and at its front side, but it is obvious, that one brush only may be used and that other types of brushes such as metal brushes or carbon brushes may be used. As shown in FIG. 2, eight magnets 3 and consequently eight poles and eight brushes are provided, the brushes being alternatively connected to positive and negative potential.

A rim of regularly spaced divisions 13, for instance coloured lines is provided at the outer rim of the rotor 7, and an electro-optical reading device 14 is mounted in the motor casing for reading passage of the divisions 13 in a manner well known in the art. As an example, the device 14 includes means for illumination of the divisions 13 and a photocell registering the reflected light, thereby producing a pulse whenever a division line 13 passes in front of the device 14. The purpose of this reading device will be explained below.

Operation of the illustrated motor may easily be understood from FIG. 2. When a direct current flows from the brushes through two adjacent commutator lamellas and any one of the windings, for instance the coil fully shown in FIG. 2, electro-dynamic forces act in the coil as indicated by arrows in FIG. 2. It is seen that a couple of opposite forces acts on each side of the coil and that a torque in anticlockwise direction results. Of course, the torque produced by each coil has a pulsating value when the motor rotates, but when the seven phase-shifted torques of all coils are superimposed, a practically constant torque is obtained.

Instead of coils of substantially square form as shown in FIG. 2, substantially triangular coils may be used with six poles, whereby again two poles or magnetic fields are within reach of each coil side.

Instead of a rotating winding and commutator as illustrated, the winding may be stationary and the magnet system may rotate. This invention is not limited to direct current motors, but instead of permanent magnets any system may be provided for alternating current operation with or without commutator. In the case of a commutator motor, commutation may also be obtained by reed contacts or transistors as is known in the art.

While the illustrated motor is adapted for continuous rotation, a similar motor may be used for limited rotation as a driving system in a relay, measuring instrument and the like. In this case, one coil only may be provided which is connected directly to the terminals without commutator and brushes.

The speed of the motor or its angular position in its application for limited angular displacement may be regulated or read respectively by means of the above reading device. When the motor is rotating continuously, pulses are produced by the reading device 14 as explained above at a frequency proportional to the speed of the motor. These pulses may be used for producing a regulating signal depending on the motor speed and pulse frequency respectively, for regulating the motor speed by means of a governor as schematically shown in FIG. 1.

In a motor for limited angular displacement the pulses produced when the rotor is displaced from its initial zero position to an indicating position may be counted for digital indication of the motor position in a manner well known per se. The above regulating signal may directly be produced in the motor when a second winding and commutator of the type described above is provided for generating direct voltage for regulating purposes.

Instead of coils made of insulated wire and assembled by means of a binding material, other coils may be used, particularly for bigger motors requiring conductors of relatively large cross section. Coils of this type may be chemically etched or cut out by punching from metal sheets. Fine sheets of insulating material may be inserted between adjacent stacked coils of this type and the winding may be also be imbedded in plastics material.

The motor as described is particularly suitable for driving gramophones, tape recorders and the like, and extremely small embodiments may be used in watchmaking.

While the coils are usually made of regular polygonal shape for practical reasons, it should be understood that the coils cannot and need not be of theorettically polygonal shape, because they always have rounded corners. Even the coil sides must not be strictly straight, the important fact being that the coil sides are substantially straight and substantially extend along a secant of the annular or disc-shaped winding.

What I claim is:

1. An electrodynamic motor having a winding without iron, intersected by axial magnetic fields, said winding comprising at least one flat coil extending through the full circumference of the winding and having a substantially polygonal shape.

2. A motor according to claim 1, wherein said winding comprises a stack of similar coils.

3. A motor according to claim 2, wherein said coils are of a substantially regular polygonal shape and are stacked upon each other with the center of each coil in the axis of the motor.

4. A motor according to claim 1, wherein a number of plane coils are stacked upon each other in axially staggered radial planes.

5. A motor according to claim 1, including a multipole magnet system, said coil having substantially straight coil sides of a length exceeding the distance between two adjacent poles of the magnet system, each coil side being thus adapted to be intersected simultaneously by the magnetic flux of two adjacent poles.

6. A motor according to claim 1, wherein a number of coils are circumferentially staggered by winding steps equal to $$\frac{2\pi}{n}$$

wherein $n$ is the number of coils.

7. A motor according to claim 1, comprising one coil adapted to be connected directly to the motor terminals, this motor serving for limited angular displacement.

8. A motor according to claim 1, including means for producing a regulating signal depending on the speed of the motor, and governor means adapted to regulate the speed in accordance with the said regulating signal.

9. A motor according to claim 1, wherein wire-wound coils are assembled to a rigid winding by means of a binding material such as plastics material, said winding being fixed on a hub of the motor.

10. A motor according to claim 1, comprising a magnet system for producing said axial magnetic fields, this magnet system being rotatable relatively to a stationary winding.

11. An electrodynamic motor comprising, in combination,
a winding rotatably mounted about an output axis, said winding including at least one flat coil of regular polygonal shape having said output axis at its geometric center, said coil presenting a plurality of similar straight sides,
a pair of oppositely poled magnets opposite said winding and disposed in identical radial spacing from said output axis and spaced from each other by an amount less than the length of each coil side, said magnets being oriented to produce magnetic fields intersecting said winding in axial direction.

12. A motor according to claim 1, including means for producing a signal depending on the angular position of the motor and governor means adapted to regulate the angular position of the motor in accordance with the said signal.

References Cited

UNITED STATES PATENTS

| 2,779,882 | 1/1957 | Ishikawa | 310—268 |
| 3,090,880 | 5/1963 | Raymond | 310—268 |
| 3,280,353 | 10/1966 | Haydon et al. | 310—154 |
| 3,348,086 | 10/1967 | Monma | 310—154 X |

DONOVAN F. DUGGAN, Primary Examiner

U.S. Cl. X.R.

310—208, 268; 318—313